Feb. 27, 1968  R. J. HOLTON  3,370,873
FASTENER MEANS

Original Filed June 13, 1961  2 Sheets-Sheet 1

INVENTOR.

ROBERT J. HOLTON

Teare, Fetzer & Teare
ATTORNEYS

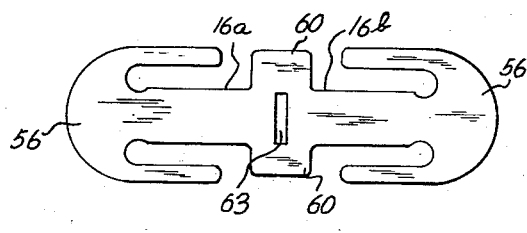
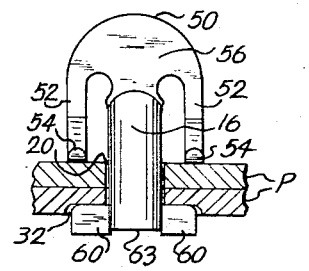
Fig. 4    Fig. 5
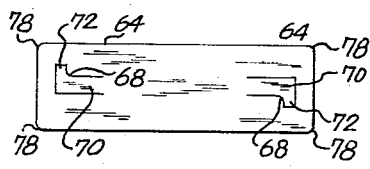
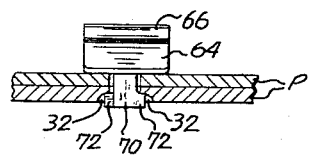
Fig. 11    Fig. 12

United States Patent Office 3,370,873
Patented Feb. 27, 1968

3,370,873
FASTENER MEANS
Robert J. Holton, Rocky River, Ohio, assignor to Tinnerman Products, Inc., Cleveland, Ohio, a corporation of Ohio
Original application June 13, 1961, Ser. No. 116,786, now Patent No. 3,190,167, dated June 22, 1965. Divided and this application Nov. 12, 1964, Ser. No. 410,354
11 Claims. (Cl. 287—189.36)

This is a divisional application of the pending United States patent application of Robert J. Holton Ser. No. 116,786, filed June 13, 1961, now Patent No. 3,190,167.

This invention relates in general to fastener means and more particularly to rotary fasteners adapted to be made from a single piece of metal stock or the like, and operative to be quickly attached and detached from an aperture supporting panel or part, in response to partial rotation of the fastener.

Rotary-type fasteners are known in the fastener art but generally these fasteners are unduly expensive and/or are somewhat difficult to attach in operative position in the receiving aperture of the supporting panel, especially if such apertures are not produced to exact tolerances, and vary somewhat in size.

Accordingly, an object of the present invention is to provide a quickly operable rotary type fastener which may be conveniently and readily actuated into holding position on an apertured supporting panel or part.

Another object of the invention is to provide a fastener of the above type which includes a shank portion adapted for passage into a receiving aperture in a supporting part or panel and wherein the shank includes means thereon for facilitating the shank's movement into the aperture irrespective of tolerance variations in the aperture size.

Another object of the invention is to provide a fastener of the above type which may be inexpensively produced from flat metal stock, such as sheet metal, to provide an economically desirable arrangement.

A more specific object of the invention is to provide a rotary type fastener produced from flat sheet metal stock and formed into a head portion and a depending split shank portion, with the head portion having downwardly extending flexible finger-like portions thereon adapted for rotative engagement with the confronting surface of an apertured support panel.

Another specific object of the invention is to provide a rotary type fastener produced from a single blank of sheet metal stock and formed into a head portion and a depending split shank portion, with the head portion having downwardly extending flexible finger-like portions thereon adapted to resiliently engage the confronting surface of the panel for holding the fastener in oriented position on the panel, and wherein the split shank portion is struck out of the material of the finger-like portions, with the shank portion being adapted to be received through a receiving aperture in the supporting panel, and having means on the split shank portion for gripping the underside of the supporting panel to hold the fastener in mounted relation on the panel.

Other objects and advantages of the invention will be apparent from the following description taken in conjunction with the accompanying drawings wherein:

FIG. 4 is a plan view of a blank from which the fastener shown in FIGS. 1 to 3 may be produced;

FIG. 5 is a sectional view showing a fastener of the FIGS. 1 to 3 type mounted on a pair of juxtaposed apertured panels and holding the latter together;

FIG. 11 is a plan view of a blank from which the fastener shown in FIG. 10 may be produced;

FIG. 12 is a sectional view showing a fastener of the FIG. 10 type mounted on a pair of juxtaposed apertured panels and holding the latter together.

Figure 1:
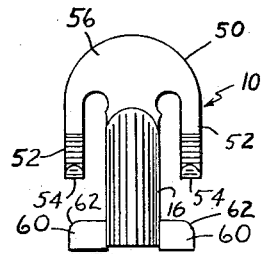
FIG. 1 is an elevational view taken from one side of a rotary fastener constructed in accordance with the instant invention.
Figure 6:
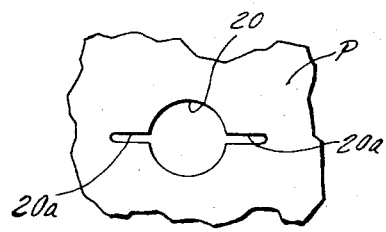
FIG. 6 is a plan view of a work panel or part provided with an aperture adapted to accommodate the fastener of the invention.
Figure 2:
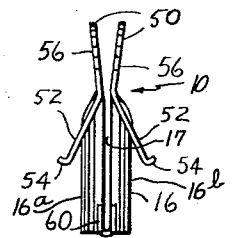
FIG. 2 is an elevational view taken from the right hand side of FIG. 1.
Figure 7:
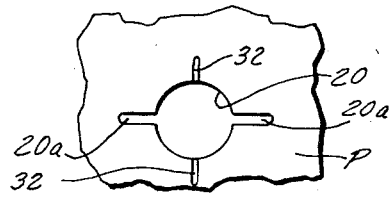
FIG. 7 is a plan view taken from the other side of the work panel of FIG. 6 and illustrating, in particular, indentations formed in the work panel for receiving therein the ends of the wings on the split shank of the rotary fastener, to aid in retaining the fastener in mounted position on the supporting panel.
Figure 3:
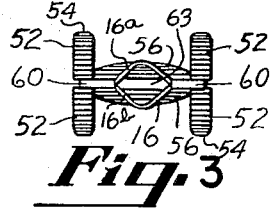
FIG. 3 is a bottom plan view of the FIGS. 1 and 2 fastener.

Referring now again to the drawings and in particular to FIGS. 1 to 3 thereof, reference number 10 designates a fastener produced in accordance with the instant invention. The fastener may be formed from a single piece or blank of sheet metal stock, as illustrated for instance in FIG. 4, with such blank being subsequently bent into the fastener configuration illustrated in FIGS. 1 to 3 inclusive.

Fastener 10 comprises a head 50 formed of tab portions 56 spaced from one another, and a split shank 16 defining leg portions 16a and 16b depending from the respective tab portion 56. Leg portions 16a and 16b are convexly curved in a transverse direction, on their exterior surfaces, and are disposed in spaced relation as at 17 with respect to one another, as are the tab portions 56, to give transverse resiliency to the shank of the fastener and to the head of the fastener, thereby facilitating its insertion into a poor tolerance aperture 20 in a supporting panel P.

Head 50 includes opposed, diagonally downwardly extending fingers 52, which are adapted to resiliently engage the confronting side of the supporting panel and exert an axial tension on the fastener, to help maintain its mounted condition on the panel. The free ends of the fingers 52 are preferably bent outwardly as at 54, to increase the rotative ability of the fastener, and it will be noted that the spacing between the shank portions 16a, 16b, and the tab portions 56 of the head, enable considerable resiliency in the finger portions 52 when the fastener is in mounted condition on the panel.

Laterally projecting lugs or wings 60 are provided on the shank adjacent its bottom end, for movement through receiving aperture 20 in a panel, and into locking coaction with the confronting side of the panel, upon turning or twisting of the fastener. The outer corners of wings 60 are preferably rounded, as illustrated, to decrease the resistance to rotation of the fastener on the panel. It will be noted that the shank is open on its bottom end, as at 63 which not only facilitates formation of the fastener into the finalized configuration illustrated, but also facilitates insertion of the fastener into a poor tolerance aperture in the supporting panel.

The fastener is inserted in the aperture 20 in the work panel, with the split open bottom shank aiding in insertion into undersized apertures. Sufficient axial compressive force is preferably applied against the resistance to compression of the fingers 52 so that the wings slightly clear the underside of the panel, and then the fastener is rotated preferably 90°, until the wings 60 move into the vicinity of the indentations 32 adjacent the periphery of the aperture. The axial compression of the fastener may then be released to permit the wings to move into the indentations 32, with the coaction between the indentations 32 and the wings aiding in retaining the fastener in attached condition on the supporting panel. Indentations 32 may be omitted, however. The distance between the wings 60 and the finger portions 52 on the head is chosen so that the wings may be flexed during twisting of the fastener, and with the wings being urged into gripping relation with the confronting side of the panel, to increase the vibration resistance of the fastener. The fastener may be rotated into holding position by the use of a pair of pliers engaging the head 50, or even by use of the workman's fingers, depending upon the size and resiliency of the fastener.

As is illustrated in FIG. 5, the fastener can be utilized to hold together two or more panels of predetermined thickness. In order to disassemble the fastener from the work panels, rotation of the fastener is effected until the ends of the wings 60 move into alignment with the elongated slotted portions 20a of the aperture, whereupon the fastener can be withdrawn from the supporting panel.

Figure 8:
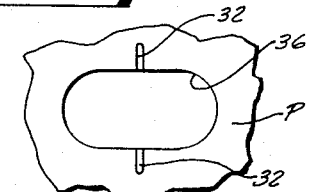
FIG. 8 is a plan view of a modified form of aperture in a supporting panel.
Figure 9:
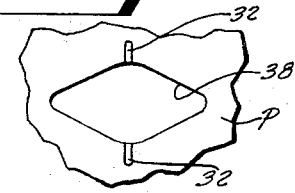
FIG. 9 is a plan view of a further modified form of aperture in a supporting panel.

FIGS. 8 and 9 illustrate possible modifications of the aperture in the panel, with FIG. 8 illustrating an elongated oval-shaped aperture 36, and FIG. 9 illustrating a more or less diamond-shaped aperture 38.

Figure 10:
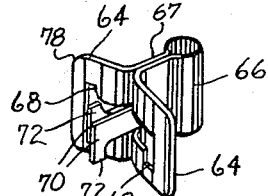
FIG. 10 is a bottom perspective view of a further embodiment of the fastener.

FIG. 10 illustrates a further embodiment of a fastener wherein the latter may be formed of a strip or blank of elongated rectangular configuration, as shown in FIG. 11, subsequently bent upon itself, with the ends of the blank spread outwardly with respect to one another to form resilient finger portions 64. The bend in the blank may be formed generally cylindrically like, as at 66, to form a head for the fastener, and the blank is formed to extend linearly downwardly from the head 66 as at 67, and then obliquely outwardly to form the finger portions 64.

The finger portions 64 may be partially severed as at 68, to form leg portions 70 which are pressed more or less together to form the depending shank of the fastener. Each of the leg portions adjacent its free ends has a lug or wing portion 72, which is adapted for holding coaction with the confronting side of the apertured supporting panel against the axial tension applied by the resilient fingers 64 when the fastener has been turned or rotated into locking position. It will be noted that the fastener of FIG. 11 utilizes substantially all of the material of the blank, and can be efficiently formed from a strip of sheet metal. The corners of the finger portions 64 are preferably rounded as at 78 to facilitate rotation of the fastener on the supporting panel. Finger portions 64 provide extremely effective "pull" on the fastener for maintaining good tension on the fastener when it is in mounted condition on a panel.

From the foregoing discussion and accompanying drawings it will be seen that the invention provides a quickly operable rotary type fastener which may be inexpensively produced from flat stock, such as sheet metal, and which comprises a head portion and a depending shank portion, and having resilient finger portions on the head portion for maintaining a tension on the fastener when it is in mounted condition on the panel. The invention also provides a fastener having a split shank portion for facilitating the insertion of the fastener into an aperture in a supporting part or panel, and wherein the fastener may be readily attached to and detached from the supporting panel or part.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

I claim:

1. A rotary fastener formed of a single piece of sheet metal and adapted for assembly with an apertured support panel comprising, a head, a split shank depending downwardly from said head and defining a pair of leg portions, wing portions projecting laterally outwardly from the distal ends of said leg portions, said wing portions being adapted for holding coaction with one side of the support panel, said head comprising a pair of oppositely disposed tab portions spaced laterally from one another, and elongated resilient fingers projecting obliquely downwardly and outwardly from each end of the respective tab portions, said fingers being laterally spaced from said shank and adapted for tensioned engagement with the other side of the support panel for urging said wing portions into holding coaction with said one side of the support panel.

2. A rotary fastener in accordance with claim 1, wherein said fingers each include bent cam-like means adjacent their distal ends for facilitating rotation of the fastener relative to a support panel.

3. A rotary fastener in accordance with claim 1, wherein a pair of laterally spaced fingers project obliquely downwardly and outwardly from each end of the respective tab portions.

4. A rotary fastener in accordance with claim 1, wherein the occluded angle between said fingers is substantially greater than the included angle between said tab portions.

5. A rotary fastener in accordance with claim 1, wherein said wings comprise a pair of oppositely disposed wings disposed on opposite sides of said shank, said wings connecting said leg portions together adjacent the distal end of said shank.

6. A rotary fastener in accordance with claim 5, wherein each of said wings is made integral with one of said leg portions and the other of said leg portions for connecting the same together.

7. A rotary fastener in accordance with claim 5, wherein said wings are each of a generally U-shaped configuration in side elevation, the opened end of said U-shaped configuration generally facing said head.

8. A rotary fastener in accordance with claim 1, the combination, including an apertured support panel having an elongated aperture extending therethrough, said fastener being disposed through said aperture, said panel having indentation means adapted to receive in holding coaction the wing portions on said fastener to lock the same in predetermined locked condition on said support panel.

9. A rotary fastener formed of a single piece of sheet metal and adapted for assembly with an apertured support panel comprising, a head, finger portions projecting angularly downwardly and outwardly from said head and adapted to resiliently engage one side of an apertured support panel, a split shank formed from partially severed portions struck out of said finger portions and depending downwardly from said head a predetermined distance below said finger portion, and oppositely disposed wings projecting laterally outwardly from said shank adjacent the distal end thereof and adapted for holding coaction with the other side of the support panel in opposition to the axial tension imparted by said finger portion.

10. A rotary fastener in accordance with claim 9, wherein said head comprises an elongated cylindrical portion and generally linear portions disposed in substantially juxtaposed relation extending downwardly from said cylindrical portion and integrally merging into said finger portions, said finger portions extending angularly downwardly and outwardly from said linear portions.

11. A rotary fastener in accordance with claim 9, wherein said finger portions are of at least as great a transverse width as compared to the width of said head when measured in the same plane.

References Cited

UNITED STATES PATENTS 2,238,854  4/1941  Wagstaff _____ 85—5
2,580,319  12/1951 Poupitch _____ 85—5 X

FOREIGN PATENTS 789,664  8/1935  France.
1,373,375  8/1964  France.

DAVID J. WILLIAMOWSKY, *Primary Examiner.*

HARRISON R. MOSELEY, *Examiner.*

J. K. BELL, *Assistant Examiner.*